(No Model.) 2 Sheets—Sheet 2.

J. G. ROBERTS.
ORE WASHER.

No. 285,307. Patented Sept. 18, 1883.

Witnesses:
A. I. Fonda
E. S. Davis

John G. Roberts, Inventor.
By H. L. Perrine, Atty.

UNITED STATES PATENT OFFICE.

JOHN G. ROBERTS, OF IDAHO SPRINGS, COLORADO.

ORE-WASHER.

SPECIFICATION forming part of Letters Patent No. 285,307, dated September 18, 1883.

Application filed May 26, 1882. (No model.)

*To all whom it may concern:*

Be it known that I, JOHN G. ROBERTS, a citizen of the United States, residing at Idaho Springs, in the county of Clear Creek and State of Colorado, have invented certain new and useful Improvements in Ore-Washers; and I do hereby declare the following to be a full, clear, and exact description of the invention, such as will enable others skilled in the art to which it appertains to make and use the same.

This invention relates to that class of buddles or ore-washers consisting in the main of a stationary circular bed over which the ore-pulp is washed by streams of water to separate the metalliferous portions from the barren gangue.

My improvement consists in constructing the sloping bed of cement; also of certain mechanical combinations stated in claims at the close of this specification, the purpose of some of which combinations is to automatically separate the metalliferous portions of ore-pulp into grades.

In order that my invention may be clearly understood, I have illustrated in the annexed drawings, and will proceed to describe, the best form thereof at present known to me.

Figure 1:
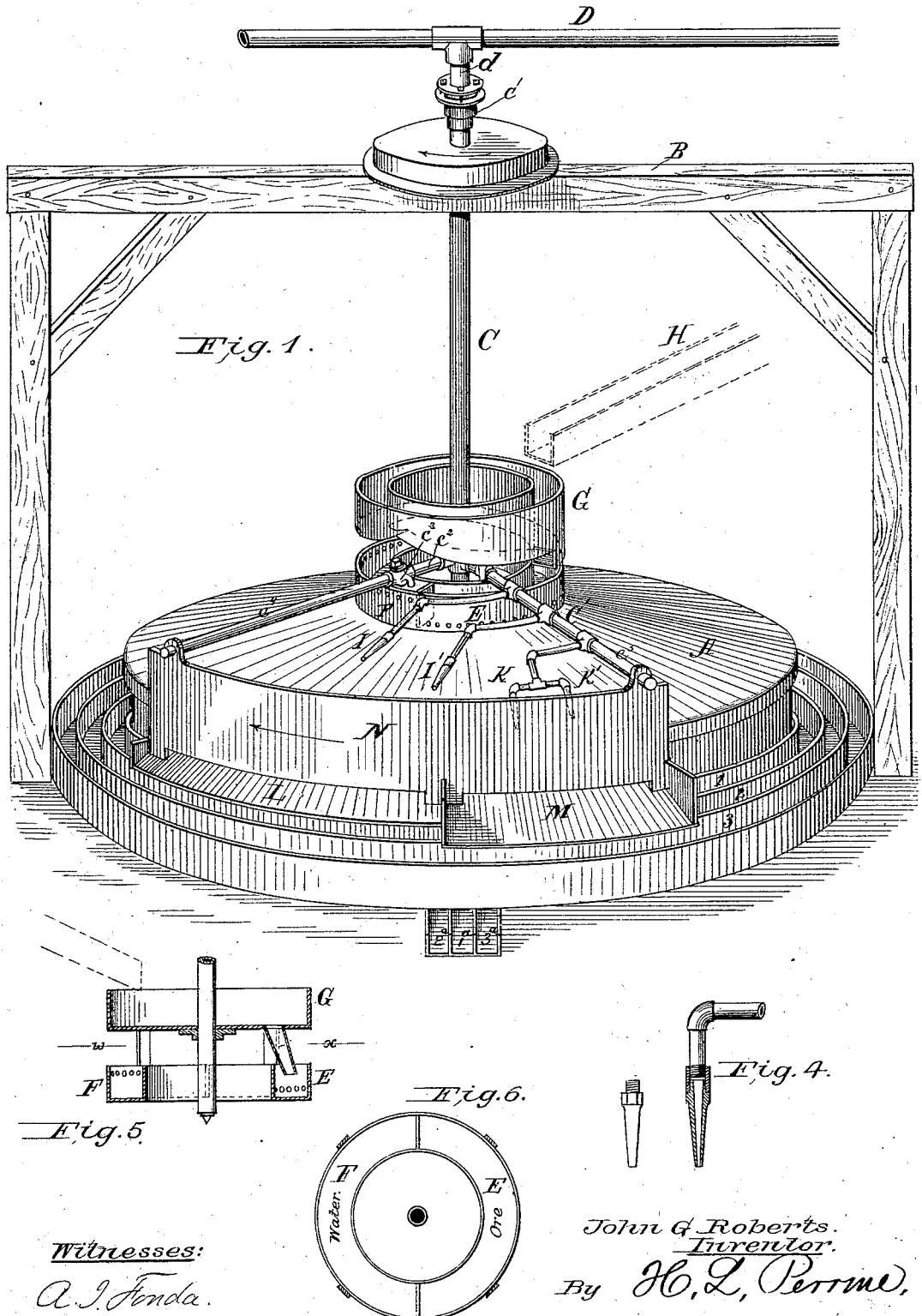
Figure 2:
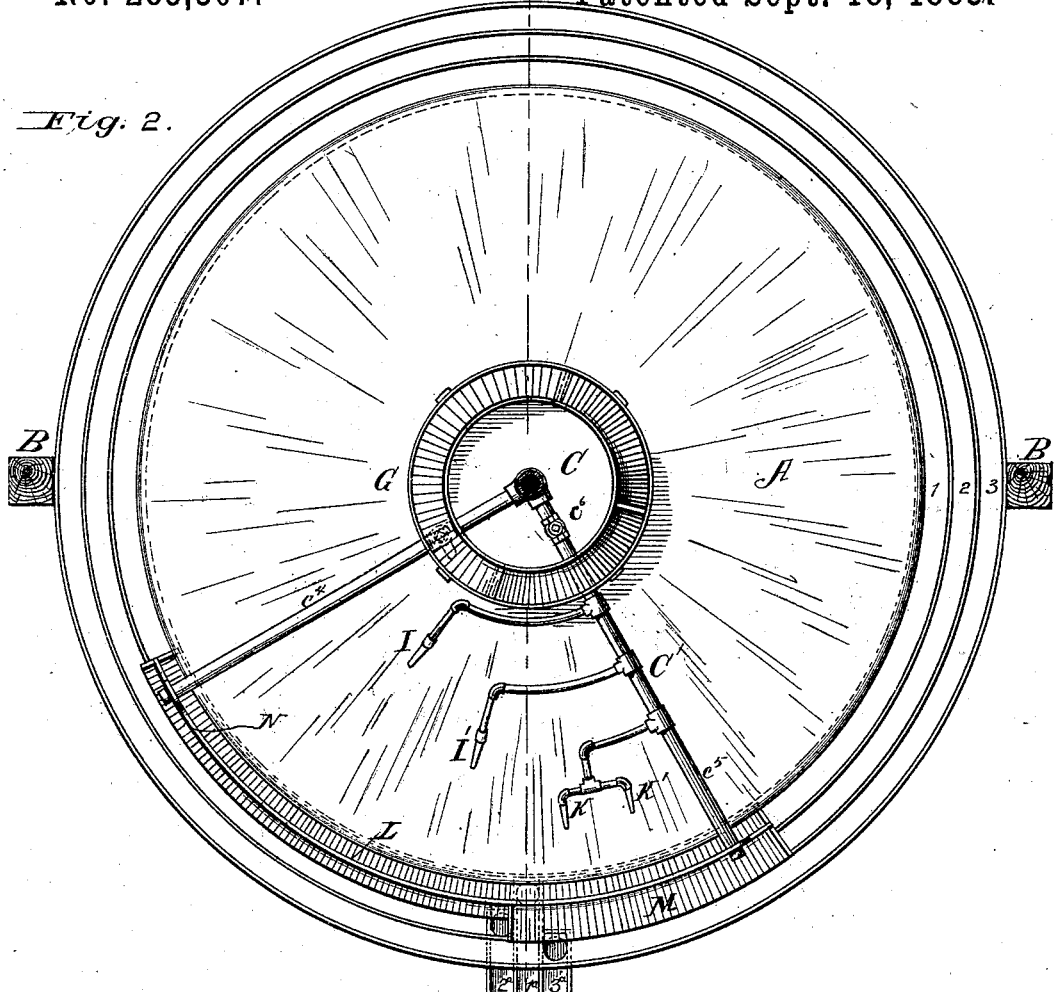
Figure 3:
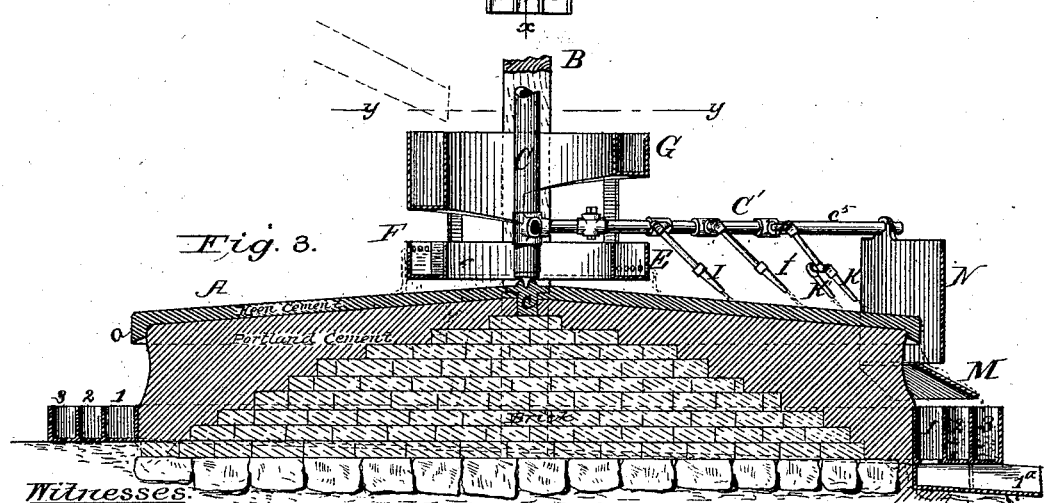

Figure 1 is a perspective view of my improved buddle. Fig. 2 is a plan view of the same. Fig. 3 is an axial section thereof. Figs. 4, 5, and 6 are detail views, Fig. 5 illustrating a modification of the hopper.

The same letters of reference indicate identical parts in all the figures.

The circular sloping bed A of the buddle consists of cement, preferably laid on a stone and brick foundation, as shown in Fig. 3. Portland cement is preferably used for the construction of the bed, and a layer of Keen cement applied as a top-dressing, to form an overhanging rim, $a$, around the top edge of the body of Portland cement. The top surface of the bed slopes downward from center to circumference at an angle of five degrees, more or less. A vertical hollow shaft, C, stands with its solid lower end in a step-bearing, $c$, at the apex of the bed, being journaled near its upper end in a suitable bearing on a gallows-frame, B, placed astride of the bed. The hollow shaft is rotated by belt-gearing or cog-gearing or other suitable means. It is supplied with water from a fixed water-supply pipe, D, to which end the upper end of the hollow shaft is connected to a branch, $d$, of the supply-pipe by means of a stuffing-box, $c'$. The ore-pulp or slime to be washed and graded is deposited upon the sloping surface of the bed by a perforated distributer, E, and the water for washing the barren gangue from the metalliferous portions flows from an open basin, F, onto the bed. Both the distributer and the basin are connected with the hollow shaft C, so as to be rotated thereby. In this instance they are formed by partitioning an annular trough into two semicircular segments, as best shown in Fig. 6, so that the discharge of pulp from the distributer is constantly preceded and followed by the overflow water from the basin. The perforations of the distributer are arranged along its bottom. The basin F may be perforated along the top edge of its rim to produce a more uniform overflow. The distributer is supplied with pulp from a circular hopper, G, placed around the hollow shaft above the distributer, and rotating therewith. The hopper may be an annular trough with an inclined bottom, as shown in Figs. 1 and 3, or a circular pan with a flat bottom, as shown in Fig. 5. The hopper is fed by a fixed spout, H. The basin F is supplied with water from a branch, $c^2$, of the hollow shaft through a cock, $c^3$, by which the supply can be properly regulated. The metalliferous portions of the pulp-ore are separated into two grades and swept from the bed by jets of water. To this end a radial branch pipe, C', is connected to the hollow shaft and provided with a series of sub-branches, terminating in nozzles I and I' and K K', arranged at proper inclinations, so that the jets of water issuing from them will sweep over the bed toward its circumference. The jets from nozzles I and I' operate to sweep the lighter metalliferous portions from the bed, moving the heavier portions toward the circumference thereof to a point where the jets from nozzles K and K' can act upon and sweep them from the bed. To this end the respective nozzles are arranged stepwise, so as to operate in succession, the nozzle I acting at a line nearest the apex of the bed, the nozzle I' following it to act at a line farther removed from the apex, while the succeeding nozzles K and K′ act at a line still farther removed from the apex, all as clearly shown in Figs. 1, 2, and 3. The branch pipe C′ is provided with a cock, C⁶, to regulate the supply of water to the nozzles and the force of the jets. The separated portions of the pulp are discharged, respectively, into three concentric circular troughs, 1 2 3, encircling the bed A, and preferably constructed with sloping bottoms, at the lowest points of which the troughs are provided with lateral discharge-spouts 1ª 2ª 3ª. The barren gangue washed from the bed by the overflow water from basin F falls directly from the bed into trough 1. The lighter metalliferous portions of the pulp are discharged into trough 2 and the heavier portion into trough 3. In order that these graded metalliferous portions may be directed into the proper troughs, adjoining chutes L and M are provided, which are connected and rotate with the hollow shaft, the chute L having a width to reach from under the edge of rim $a$ of the bed to a line just beyond the inner edge of trough 2, while the chute M has a width reaching from under the edge of the rim $a$ of the bed to a line just beyond the inner edge of trough 3. The chutes are segmental, and have a combined length greater than the arc included between the axial lines of the nozzles I and K′ at the edge of the bed. The chute L extends beyond and in advance of the sweep of nozzle I, and chute M extends beyond and in rear of the sweep of nozzle K′. The chutes are secured to a curved vertical guard-plate, N, which is in turn secured to and carried by rods $c^4$ and $c^5$, secured, respectively, to cock $c^3$ and branch pipe C′. The guard-plate will check any splashing due to the action of the jets.

In practice the hollow shaft, with its connections, is rotated in the direction indicated by the arrow in Fig. 1 at the rate of about one turn per minute. The first-grade ore recovered at trough 3 will be ready for smelting. The second grade recovered at trough 2, being not sufficiently concentrated to pay smelting, is returned for rewashing, to recover from it any sufficiently heavy particles. The gangue is run off as waste.

I do not confine myself to the details of construction shown and described, since they may be greatly varied without changing the essential character of my invention.

By the use of cement I am enabled to get a smooth, hard, even, and true surface, which does not corrode or rot, and can be easily prepared and repaired.

Having thus described my invention, what I claim is—

1. A buddle the sloping bed of which is formed of cement laid upon a solid foundation, substantially as before set forth.

2. In a buddle or ore-washer, the combination, substantially as before set forth, of a stationary outwardly-sloping bed, an overflow-water basin arranged at the apex thereof, and a series of rotating nozzles arranged stepwise and adapted to discharge jets of water to sweep over the bed toward its circumference to separate the barren gangue from the ore and the ore into grades.

3. The combination, substantially as before set forth, of a stationary outwardly-sloping bed, a rotating ore-pulp distributer, and a rotating overflow-water basin arranged at the apex thereof, and a series of rotating nozzles arranged stepwise and adapted to discharge jets of water sweeping the bed toward its circumference.

4. The combination, substantially as before set forth, of a stationary sloping bed, a rotating ore-pulp distributer, and a rotating overflow-water basin arranged at the apex thereof, a series of rotating nozzles arranged stepwise and adapted to discharge jets of water, a series of concentric troughs around the bed, and chutes connected to and moving with the rotating nozzles for directing portions of the separated ore-pulp into the respective troughs outside of the one next to the bed.

5. The combination, substantially as before set forth, of the stationary sloping bed, a rotating nozzle or nozzles adapted to discharge sweeping jets of water upon the same, and a guard-plate connected to and moving with the rotating nozzles to check splashing due to the jets.

In testimony whereof I affix my signature in presence of two witnesses.

JOHN G. ROBERTS.

Witnesses:
L. P. REYNOLDS,
JAMES GILLMORE.